UNITED STATES PATENT OFFICE.

JAMES HENDERSON, OF BELLEFONTE, PENNSYLVANIA, ASSIGNOR TO CHARLES G. FRANCKLYN, OF NEW YORK, N. Y.

COMPOUND FOR FURNACE-LININGS.

SPECIFICATION forming part of Letters Patent No. 265,068, dated September 26, 1882.

Application filed August 10, 1882. (No specimens.)

*To all whom it may concern:*

Be it known that I, JAMES HENDERSON, of Bellefonte, county of Centre, and State of Pennsylvania, (formerly of New York city,) have invented a new and useful Improvement in Compounds for Furnace-Linings and Fire-Brick, of which the following is such specification as will enable those skilled in the art to understand and make the same.

This my invention is based on the discovery that a compound of silica, water, and glucose forms a substance which is hard and refractory when used as a lining for furnaces, converters, or other metallurgic vessels, and that oxide of iron may be incorporated in the compound with good results, as hereinafter specified.

In carrying out this my invention, I use the purer qualities of sea-sand; or pulverized sandstone—such as is used in the manufacture of glass—or washed river-sand—such as is used for lining hearths of furnaces used for heating iron—will answer the purpose, or that which contains oxide of iron in admixture in the natural state, such as the sandstone used for grindstones, found near Massillon, in the State of Ohio. The sand is preferably reduced to a fine flour, so that it will pass through a sieve of about three thousand six hundred meshes to the square inch. Glucose and water are mixed together, preferably in the proportions of one part of glucose to one and a third to one and a half parts water, by bulk, and this mixture is mixed with the sand, so as to form a thick mortar. This mortar may be applied to the sides and bottoms of reverberatory furnaces, or as a lining to other metallurgic vessels, and dried by the atmosphere, when it is ready for use. Linings and brick thus made are hard and refractory.

To the compound above described may be added oxide of iron (when it is not already present in the silica or sand) in a finely-divided state, preferably the iron sands of the seashore, which are composed of silica, oxide of iron, and titanic acid, or it may be the oxide of iron separated from the other substances by a magnetic separator, or a pure oxide of iron and silica—such as the magnetic ore known as the "Fisher ore," found on the shores of Lake Champlain—or any other iron ore which is a compound of oxide of iron and silica, and which does not contain enough of other substances to form a fusible compound at highest temperatures, which are ground to flour, or so that it will pass through a sieve of about three thousand six hundred meshes to the square inch. This is added to the ingredients of the compound above set forth, in a dry state, in the proportion of about ten per cent. of oxide of iron to the silica or sand used, by weight.

This compound of silica, oxide of iron, glucose, and water, when exposed to high temperatures, does not expand or contract, and is harder and firmer than that hereinbefore described. It may be used in the same manner as hereinbefore described, either as a lining applied wet or made into brick, which are ready for use when dried at the ordinary temperatures, or be burned in kilns after drying, as preferred.

Instead of glucose, as above specified, I may use dextrine, starch, cellulose, gum-arabic, molasses, or like substances from which sugar or starch may be extracted, and dissolve them in the water. Wheat, rye, or other grain flour, pea, bean, or oat meal, wood pulp, or other like vegetable material from which sugar or starch may be extracted, may be added to the water in a finely-divided condition, and mixed with it to a thin paste, or so that the finely-divided substances are held in suspension, and this water or thin paste used in making the compound.

For the purposes of this invention the substances above set forth are the equivalents of glucose when used as herein described.

I do not wish to be understood as limiting myself to the exact proportions of glucose herein given, as less glucose may be used, provided sufficient glucose or other binding substance be used to bind the silica together. When a substitute for glucose, as above given, is used, the compound may be treated in the same manner as when glucose is used—that is, used wet as a lining or molded into brick and dried. Nor do I wish to be understood as limiting myself to the exact proportions of oxide of iron hereinbefore given, as good results may be obtained when more or up to twenty (20) per cent.; but the compound is not so refractory as when less is used; or less than ten per cent. may be used to one per cent. of the compound, in which case the compound has a tendency to expand and contract with the change of temperatures from high to low.

I do not claim in this application the compound of silica with a vegetable substance from which starch or glucose may be derived and water, as that is claimed in another application filed by me about the 23d day of August, 1882.

What I claim as new, and desire to secure by Letters Patent, is—

1. The compound for furnace-linings and fire brick, consisting of silica, a vegetable substance from which starch or sugar may be extracted, oxide of iron, and water, as specified and set forth.

2. The compound for furnace-linings and fire-brick, consisting of silica, glucose, oxide of iron, and water, as specified and set forth.

JAMES HENDERSON.

Witnesses:
E. M. BLANCHARD,
J. IRWIN HAGERMAN.